(12) United States Patent
Nakamori et al.

(10) Patent No.: US 11,778,276 B2
(45) Date of Patent: Oct. 3, 2023

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Yuta Nakamori, Tokyo (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/379,357

(22) Filed: Jul. 19, 2021

(65) Prior Publication Data
US 2022/0256246 A1    Aug. 11, 2022

(30) Foreign Application Priority Data
Feb. 5, 2021   (JP) .................................. 2021-017560

(51) Int. Cl.
| H04N 21/475 | (2011.01) |
| H04N 21/4788 | (2011.01) |
| G06F 21/32 | (2013.01) |
| G06F 21/62 | (2013.01) |
| G06F 16/16 | (2019.01) |

(52) U.S. Cl.
CPC ....... *H04N 21/4756* (2013.01); *G06F 16/168* (2019.01); *G06F 21/32* (2013.01); *G06F 21/6218* (2013.01); *H04N 21/4788* (2013.01)

(58) Field of Classification Search
CPC ............ H04N 21/4756; H04N 21/4788; G06F 16/168; G06F 21/32; G06F 21/6218
See application file for complete search history.

(56) References Cited

U.S. PATENT DOCUMENTS

| 10,599,739 B2 | 3/2020 | Suzuki et al. |
| 2009/0299824 A1* | 12/2009 | Barnes, Jr. ........ G06Q 10/06393 705/347 |
| 2015/0150032 A1* | 5/2015 | Birnkrant ........... H04N 21/4415 725/12 |
| 2015/0356093 A1* | 12/2015 | Abbas ................. G06F 3/04883 707/748 |
| 2018/0109482 A1* | 4/2018 | DeLuca ................. G06N 20/00 |
| 2018/0150559 A1* | 5/2018 | Ahuja .................... G06F 16/951 |
| 2019/0138463 A1 | 5/2019 | Kurata et al. |

FOREIGN PATENT DOCUMENTS

| JP | 2010-147507 A | 7/2010 |
| JP | 2014-67359 A | 4/2014 |
| JP | 2015-225445 A | 12/2015 |
| JP | 2017-211862 A | 11/2017 |
| WO | 2008/126368 A1 | 10/2008 |

* cited by examiner

*Primary Examiner* — Alazar Tilahun
(74) *Attorney, Agent, or Firm* — Oliff PLC

(57) ABSTRACT

An information processing apparatus includes a processor configured to, in a case where a rating that is of a user for a rating target and that is based on biometric information of the user matches a rating of the user for the rating target on application software used by the user, permit the user to post the rating using the application software.

19 Claims, 4 Drawing Sheets

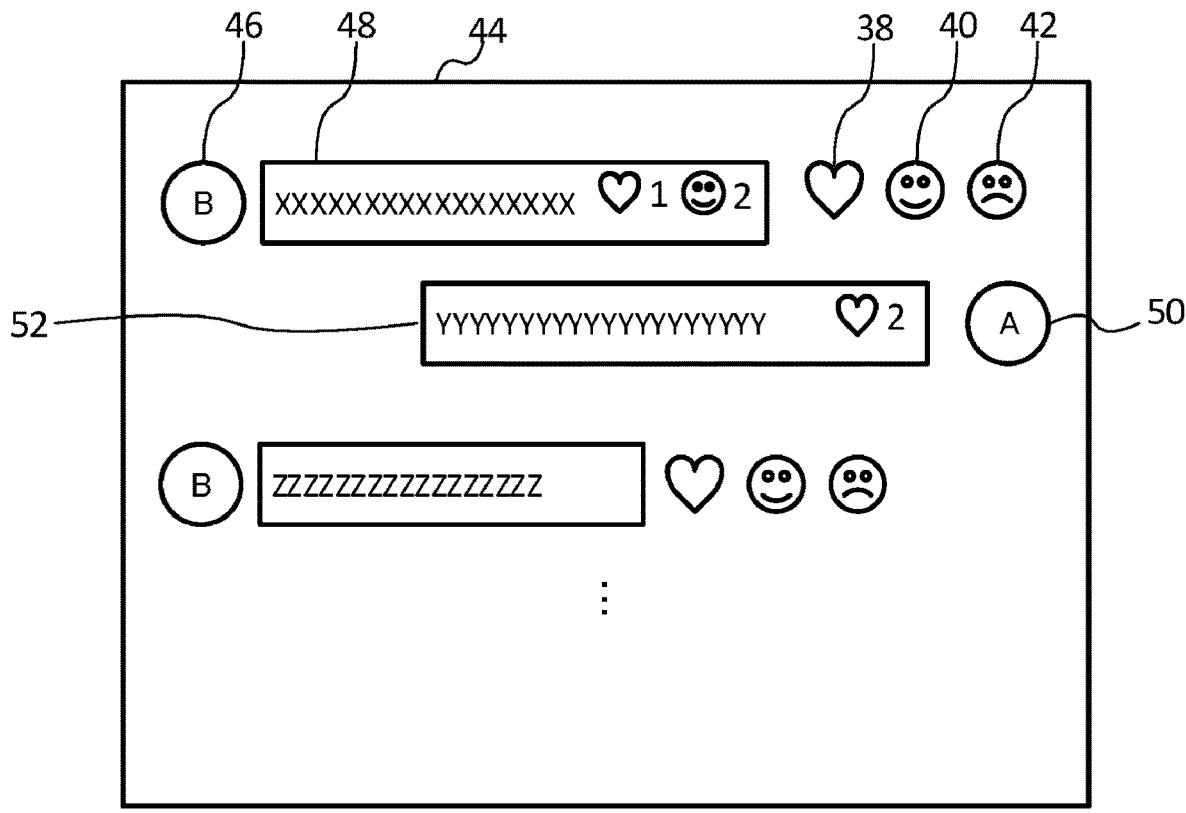

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-017560 filed Feb. 5, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 2017-211862 describes an apparatus that displays, on a display, display prompting a user who plays content, with which biometric information is associated, to perform an operation, and, in response to an operation performed by the user, plays the biometric information and the content.

Japanese Unexamined Patent Application Publication No. 2010-147507 describes an apparatus that identifies a community to which a user belongs, and generates meta data in association with video content and the community.

Japanese Unexamined Patent Application Publication No. 2015-225445 describes an apparatus that associates a plurality of items of tag information with each other, which are given to object information present on a social network.

Japanese Unexamined Patent Application Publication No. 2014-67359 describes an apparatus that obtains biometric information related to authentication from a rating input terminal provided for each rating target, verifies the obtained biometric information, specifies user identification information associated with the biometric information, extracts an information posting destination on a network associated with the specified user identification information, and posts rating information for the rating target to the extracted information posting destination on the network.

SUMMARY

Aspects of non-limiting embodiments of the present disclosure relate to, in the case of posting a rating using application software used for posting a rating of a user for a rating target, allowing the user to post a more accurate rating for the rating target, compared to the case where a rating of the user for the rating target is posted only with the user's arbitrary operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, in a case where a rating that is of a user for a rating target and that is based on biometric information of the user matches a rating of the user for the rating target on application software used by the user, permit the user to post the rating using the application software.

BRIEF DESCRIPTION OF THE DRAWINGS

An exemplary embodiment of the present disclosure will be described in detail based on the following figures, wherein:

FIG. 5 is a diagram illustrating a screen;

FIG. 6 is a diagram illustrating a screen;

DETAILED DESCRIPTION

Figure 1:
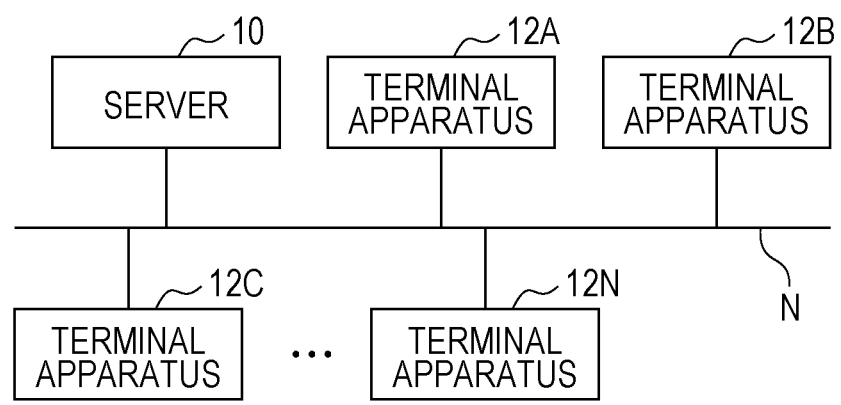
FIG. 1 is a block diagram illustrating the configuration of an information processing system according to an exemplary embodiment.

An information processing system according to an exemplary embodiment will be described with reference to FIG. 1. FIG. 1 illustrates an example of the configuration of the information processing system according to the present exemplary embodiment.

The information processing system according to the present exemplary embodiment includes, for example, a server 10 and N (N is an integer greater than or equal to 1) terminal apparatus(es). In the example illustrated in FIG. 1, the information processing system according to the present exemplary embodiment includes terminal apparatuses 12A, 12B, 12C, . . . , and 12N. The number of terminal apparatuses illustrated in FIG. 1 is only exemplary, and it is only necessary that one or more terminal apparatuses be included in the information processing system according to the present exemplary embodiment. Hereinafter, the terminal apparatuses 12A, 12B, 12C, . . . , and 12N will be referred to as "terminal apparatuses 12" when it is unnecessary to distinguish among them. The information processing system according to the present exemplary embodiment may include other apparatuses other than the server 10 and the terminal apparatuses 12.

The server 10 and each terminal apparatus 12 have the function of communicating with other apparatuses. The communication may be wired communication using cables or may be wireless communication. In short, each apparatus may be physically connected to another apparatus by cables and send/receive information to/from each other, or send/receive information to/from each other by wireless communication. Wireless communication includes, for example, near-field communication (NFC) and Wi-Fi (registered trademark). NFC includes, for example, Bluetooth (registered trademark) and radio frequency identifier (RFID). For example, each apparatus may communicate with another apparatus via a communication channel N such as a local area network (LAN) or the Internet.

The server 10 provides online services via the communication channel N. Users may use the online services using the terminal apparatuses 12. For example, users may convey various types of information, such as sounds, images, videos, character strings, vibrations, and biometric information, to their communication partners by using the online services.

The online services are, for example, online meetings, services that provide content online, online games, online shopping, social networking services (SNS), or a combination thereof. Online meetings may be referred to as web meetings, remote meetings, or video meetings. Content includes, for example, entertainment (such as concerts, theaters, movies, videos, and music), sports, and e-sports. For example, video distribution services and music distribution services are examples of services that provide content online. Users may watch entertainment, sports, and e-sports online.

The online services may be services that use virtual space or services that do not use virtual space. Virtual space is a concept contrasted with real space, and is, for example, virtual space realized with a computer, virtual space formed on a network such as the Internet, virtual space realized with virtual reality (VR) technology, or cyber space. For example, virtual three-dimensional space or two-dimensional space corresponds to an example of virtual space.

In addition, the server 10 stores and manages account information of users who use the online services. Account information is information for logging in to the online services and using the online services, and is information that includes, for example, a user identification (ID) and a password. For example, by sending account information to the server 10 and logging in to the online services, a user who is linked to the account information may be permitted to participate in the online services and use the online services. Needless to say, users may be allowed to use the online services without registering their account information in the online services. In addition, users may be allowed to use the online services without logging in to the online services. Note that the server 10 may provide different services depending on whether users are logged in.

Each terminal apparatus 12 is, for example, a personal computer (hereinafter abbreviated as "PC"), a tablet PC, a smartphone, a wearable device (such as augmented reality (AR) glasses, virtual reality (VR) glasses, mixed reality (MR) glasses, or a hearable device), or a cellular phone.

A wearable device is a hearable device worn on each ear of an animal (such as a human or non-human animal), a device worn on the head of an animal, a device worn on a wrist, arm, or finger (hereinafter referred to as a "wrist, etc.") of an animal (such as a watch-type device including a smartwatch), a device worn on the neck of an animal, a device worn on the body (such as the chest or abdomen) of an animal, a device worn on a lower leg of an animal (such as a human thigh, lower thigh, knee, foot, or ankle), a glasses-type device, or a contact-lens-type device.

A hearable device may be, for example, earphones, a hearing aid, a pierced-earring-type device, a clip-type device, or a device that includes a band or cable to be wrapped around each ear. A device worn on the head may be, for example, a headset that includes a band or cable to be wrapped around the head. A device worn on a wrist, etc. may be, for example, a device that includes a band or cable to be wrapped around a wrist, etc. Devices worn on the other parts may include a band or cable.

In addition, a wearable device may be a device that uses technology for extending the real space or real environment (such as the real space or real environment perceived by a human). As technology for this, technology such as AR technology or MR technology is used. For example, a wearable device may be a device that displays a virtual object (such as an image or a character string) in the real space using AR technology or MR technology. In addition, a wearable device may be a device that realizes VR.

For example, AR glasses, MR glasses, or VR glasses, which are glasses-type devices, may be used as a wearable device. In addition, a device called smart glasses may be used as a wearable device. For example, a device which is a glasses-type device and which displays information (such as an image or a character string) on a transparent display (such as the glass-portions of the glasses) may be used as a wearable device. A head-mounted display (HMD) adopting AR technology, MR technology, or VR technology may be used as a wearable device.

Note that an auto-responder such as a chat bot may participate in the online services. For example, the auto-responder functions as a responder assistant that responds to an inquiry from a user, and receives what the user said, analyzes the contents of what the user said, generates a response to what the user said, and reports the response to the user. The auto-responder is realized by, for example, executing a program. The program is stored in, for example, the server 10 or another apparatus (such as another server or a terminal apparatus 12). The auto-responder may be realized by artificial intelligence (AI). An algorithm used in AI may be of any type.

Figure 2:
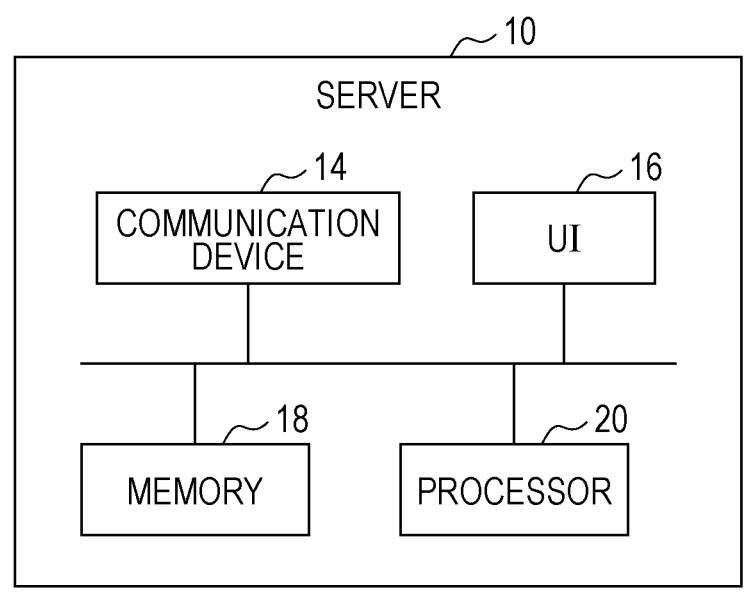
FIG. 2 is a block diagram illustrating the configuration of a server.

Hereinafter, the hardware configuration of the server 10 will be described with reference to FIG. 2. FIG. 2 illustrates an example of the hardware configuration of the server 10.

The server 10 includes, for example, a communication device 14, a user interface (UI) 16, a memory 18, and a processor 20.

The communication device 14 is a communication interface with a communication chip and a communication circuit, and has the function of sending information to another device and the function of receiving information from another device. The communication device 14 may have a wireless communication function or a wired communication function. The communication device 14 may communicate with another device by using, for example, NFC, or may communicate with another device via the communication channel N.

The UI 16 is a user interface, and includes a display and at least one input device. The display is, for example, a liquid crystal display or an electroluminescence (EL) display. The input device includes, for example, a keyboard, a mouse, input keys, or an operation panel. The UI 16 may be a UI such as a touchscreen that serves as both a display and an input device.

The memory 18 is a device that forms one or more storage areas for storing various types of information. The memory 18 includes, for example, a hard disk drive, various types of memory (such as random-access memory (RAM), dynamic RAM (DRAM), or read-only memory (ROM)), other storage devices (such as optical discs), or a combination thereof. One or more memories 18 are included in the server 10.

The processor 20 is configured to control the operation of each unit of the server 10. The processor 20 may include memory. For example, the processor 20 provides online services to users.

Figure 3:
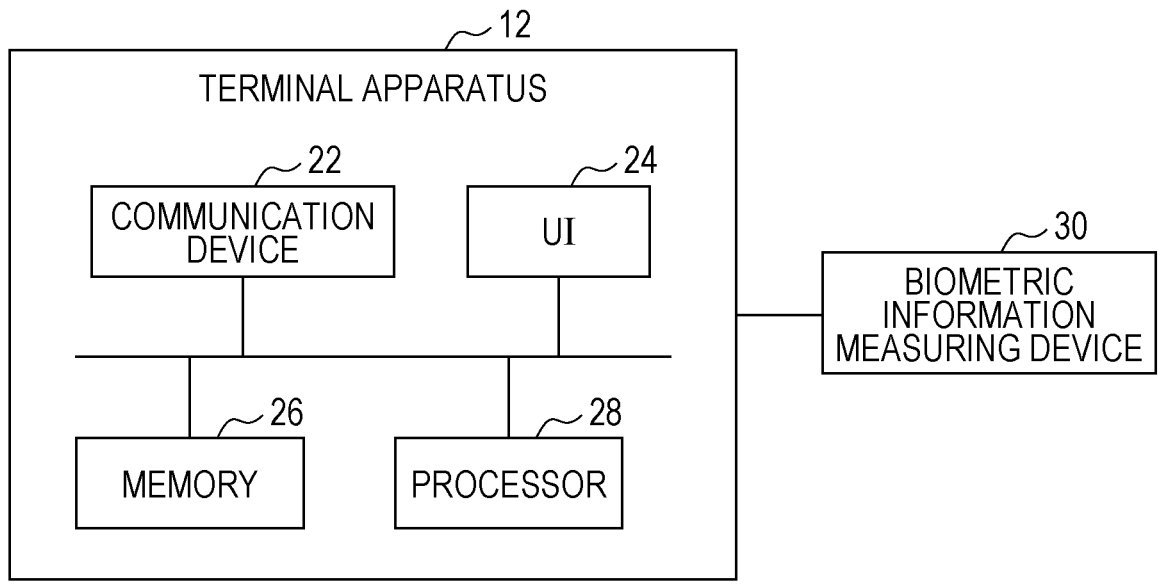
FIG. 3 is a block diagram illustrating the configuration of a terminal apparatus.

Hereinafter, the hardware configuration of each terminal apparatus 12 will be described with reference to FIG. 3. FIG. 3 illustrates an example of the hardware configuration of each terminal apparatus 12.

Each terminal apparatus 12 includes, for example, a communication device 22, a UI 24, a memory 26, and a processor 28.

The communication device 22 is a communication interface with a communication chip and a communication circuit, and has the function of sending information to another device and the function of receiving information sent from another device. The communication device 22 may have a wireless communication function or a wired communication function. The communication device 22 may communicate with another device by using, for example, NFC, or may communicate with another device via the communication channel N.

The UI 24 is a user interface, and includes a display and at least one input device. The display is, for example, a liquid crystal display or an electroluminescence (EL) display. The input device includes, for example, a keyboard, a mouse, input keys, or an operation panel. The UI 24 may be a UI such as a touchscreen that serves as both a display and an input device.

In addition, the terminal apparatus 12 may include an image capturing apparatus such as a camera, a microphone, and a loudspeaker, and all or some of them may be connected to the terminal apparatus 12. In addition, earphones or headphones may be connected to the terminal apparatus 12.

The memory 26 is a device that forms one or more storage areas for storing various types of information. The memory 26 includes, for example, a hard disk drive, various types of memory (such as RAM, DRAM, or ROM), other storage devices (such as optical discs), or a combination thereof. One or more memories 26 are included in the terminal apparatus 12.

The processor 28 is configured to control the operation of each unit of the terminal apparatus 12. The processor 28 may include memory.

In addition, a biometric information measuring device 30 measures biometric information and sends the biometric information to the terminal apparatus 12, and the processor 28 receives the biometric information.

The biometric information measuring device 30 includes various sensors and electrodes, and measures biometric information of a living body (such as a human, non-human animal, or plant). In the case where a plurality of biometric information measuring devices 30 are used, these biometric information measuring devices 30 may measure different types of biometric information. Some or all of the biometric information measuring devices 30 may measure the same type of biometric information. In addition, each biometric information measuring device 30 may measure one type of biometric information or multiple types of biometric information.

Biometric information may include various types of information generated from a living body. Biometric information is, for example, information indicating brain activities (such as brain waves, brain blood flow, and brain magnetic field signals), information indicating a pulse rate, myoelectric information such as a myoelectric waveform, information regarding saliva (such as information indicating the volume of saliva), information indicating a pulse wave, information indicating a blood pressure, information indicating a blood flow, information indicating a pulse, information indicating a heart rate, information indicating an electrocardiographic waveform, information indicating eye movement, information indicating a body temperature, information indicating a sweat rate, information indicating the line of sight, audio information, information indicating a human movement, information indicating a human expression, information specified by a biomarker, or information obtained from body fluid (such as blood). In addition, biometric information may be information derived from a potential detected from a living body. For example, biometric information may be brain waves, which are the result of measuring minute current generated by brain activity, an electrocardiogram, which is the result of measuring minute current generated by pulsation of the heart, an electromyogram, which is the result of measuring minute current generated by muscle activity, or a skin potential, which is the result of measuring minute current generated on the skin. These are merely examples of biometric information, and other biometric information may be used.

By analyzing biometric information, emotional information, mental information, psychological information, or the like, which are examples of a human's state information, may be obtained. For example, by analyzing a human's biometric information, information indicating the human's emotion, information indicating the human's mental state, or information indicating the human's psychological state may be obtained. Needless to say, by analyzing biometric information of a non-human animal or plant, information indicating the state of the non-human animal or plant may be obtained. For example, a human's state information is, for example, the state of feeling three major needs, namely, needs for food, sleep, and sex, or consciousness mainly including feelings. More specifically, a human's state information is information such as relief, anxiety, appreciation, shock, excitement, sexual arousal, curiosity, sexual curiosity, calmness, emaciation (impatience), mystery (confusion), happiness, luck, relaxation, tension, privilege, responsibility, respect, familiarity (intimacy), yearning (longing), desire (motivation), fear, courage, delight, pleasure (regarding good deeds and virtue), regret, satisfaction, dissatisfaction, remorse, disgust, shame, contempt, jealousy, guilt, murderous intent, schadenfreude, saudade, expectation, superiority, inferiority, resentment, grudge, suffering, sadness, painfulness, sensation, anger, trouble (anguish, torment, or agony), acceptance of despair (surrender), despair, hope, hatred (love and hatred), affection, and emptiness. Other examples include itching, pain, urge to urinate, urge to defecate, feeling hungry, and feeling full. In addition, as person-to-person communication transmission information, there is information regarding people's thoughts and intentions. Examples of the above include countenance, agreement, disagreement, refusal, hesitation, and confusion.

The biometric information measuring device 30 may be a device (such as a wearable device) worn by a living body to measure biometric information, or a device that measures biometric information without being worn by a living body. Biometric information measuring devices 30 may be worn on multiple parts.

The biometric information measuring device 30 may be a contact-type device which is a device that measures a living body's biometric information while being in contact with the living body, or a contactless device that measures a living body's biometric information without being in contact with the living body. The biometric information measuring device 30 may be a device that serves as both a contact-type device and a contactless device. In short, the biometric information measuring device 30 may measure a living body's biometric information while being in contact with the living body, and further measure a living body's biometric information without being in contact with the living body. Biometric information measured by being in contact with a living body and biometric information measured without being in contact with a living body may be the same type of biometric information, or different types of biometric information.

The biometric information measuring device 30 may analyze the measured biometric information and send information indicating the analysis result to the terminal apparatus 12. For example, the biometric information measuring device 30 measures a human's biometric information, analyze the biometric information, and send information indicating the analysis result (such as the human's state information) to the terminal apparatus 12.

Note that biometric information may be sent to the server 10, and the processor 20 of the server 10 may analyze the biometric information.

The processor 28 of the terminal apparatus 12 receives biometric information from the biometric information measuring device 30, analyze the biometric information, store the biometric information, output the biometric information, store information indicating the result of analyzing the biometric information, and output information indicating the result of analyzing the biometric information. Needless to say, the analysis of the biometric information may be done by the biometric information measuring device 30 or another apparatus (such as the server 10). Outputting the biometric information is, for example, displaying the biometric information or outputting the biometric information as audio information. Outputting information indicating the result of analyzing the biometric information is, for example, displaying information indicating the analysis result or outputting the analysis result as audio information. The processor 28 of the terminal apparatus 12 may send the biometric information or information indicating the analysis result to another apparatus.

The terminal apparatus 12 may include one or more biometric information measuring devices 30. In short, one or more biometric information measuring devices 30 may be incorporated into the terminal apparatus 12 to configure one apparatus. The entirety of the terminal apparatus 12 including one or more biometric information measuring devices 30 may be worn by a living body to measure biometric information. Needless to say, the terminal apparatus 12 and the biometric information measuring device 30 may be separate devices. For example, the terminal apparatus 12 may be an apparatus such as a PC or a smartphone, and the biometric information measuring device 30 may be worn by a human, like a smartwatch.

Hereinafter, examples of the present exemplary embodiment will be described. The processor 20 of the server 10 or the processor 28 of each terminal apparatus 12 may execute processing according to each example, or the processor 20 and the processor 28 may cooperate to perform processing according to each example. One part of certain processing may be executed by the processor 20, and another part of the processing may be executed by the processor 28. Note that the server 10, each terminal apparatus 12, or a combination thereof corresponds to an example of an information processing apparatus according to the present exemplary embodiment.

For example, in a case where a rating that is of a user for a rating target and that is based on biometric information of the user matches a rating of the user for the rating target on application software used by the user, the processor 28 of a corresponding one of the terminal apparatuses 12 permits the user to post the rating using the application software. In the case where a rating based on biometric information of the user does not match a rating of the user on application software, the processor 28 of a corresponding one of the terminal apparatuses 12 does not permit the user to post the rating using the application software. Note that the processor 20 of the server 10 may or may not permit the user to post the rating using the application software.

A rating target is not particularly limited, and is one perceivable by any of the five senses, such as an image, video, sound including music and voice, character string (such as a message), odor, smell, vibration, file, folder, tangible object, or event. For example, by displaying an image, video, or character string on a display, the image, video, or character string is perceived by the user. By emitting a sound such as music from a loudspeaker, the sound such as music is perceived by the user.

A rating is determining and defining what kind of value a rating target has (such as the value of being superior or inferior, good or evil, beautiful or ugly, and so forth).

Hereinafter, a rating based on biometric information will be referred to as a "first rating", and a rating on application software will be referred to as a "second rating". For example, by analyzing the user's biometric information measured by the biometric information measuring device 30, a first rating of the user for a rating target is estimated, and a rating designated by the user on application software is a second rating.

The range of the concept that a first rating and a second rating match includes that there is no difference between the first rating and the second rating, and the difference is included within a tolerance.

Application software may be application software realizing the function of allowing the user to perceive a rating target, application software realizing the function of allowing the user to perceive a rating target and the function of allowing the user to rate the rating target, or application software realizing the function of allowing the user to rate a rating target.

For example, application software realizes the function of displaying an image, video, or character string (such as a message), which is a rating target, on a display, and further realizes the function of allowing the user to rate the rating target. The user looks at the rating target, such as the image, video, or character string displayed on the display, and rates the rating target using the function of the application software. In another example, application software realizes the function of emitting a sound such as music, which is a rating target, from a loudspeaker, and further realizes the function of allowing the user to rate the rating target.

Executing application software that is a web browser, accessing a video distribution site or a music distribution site to play a video or music, and rating the video or music on the video distribution site or the music distribution site also corresponds to an example of a rating on application software.

Application software realizing the function of allowing the user to perceive a rating target and application software realizing the function of allowing the user to rate the rating target may be separate pieces of application software. For example, by executing application software realizing video playback, a video may be displayed and played on the display, and the user may execute another piece of application software realizing rating to rate the video.

A first rating based on the user's biometric information may be a rating based on biometric information measured from the user over a time that is longer than or equal to a predetermined length. The predetermined length may be changed in accordance with the rating target. For example, in the case where the rating target is a video or music, and in the case where the entire video or music is played and biometric information is measured in the entire playback period, a first rating may be specified on the basis of the biometric information.

Hereinafter, examples will be described.

Example 1

Figure 4:
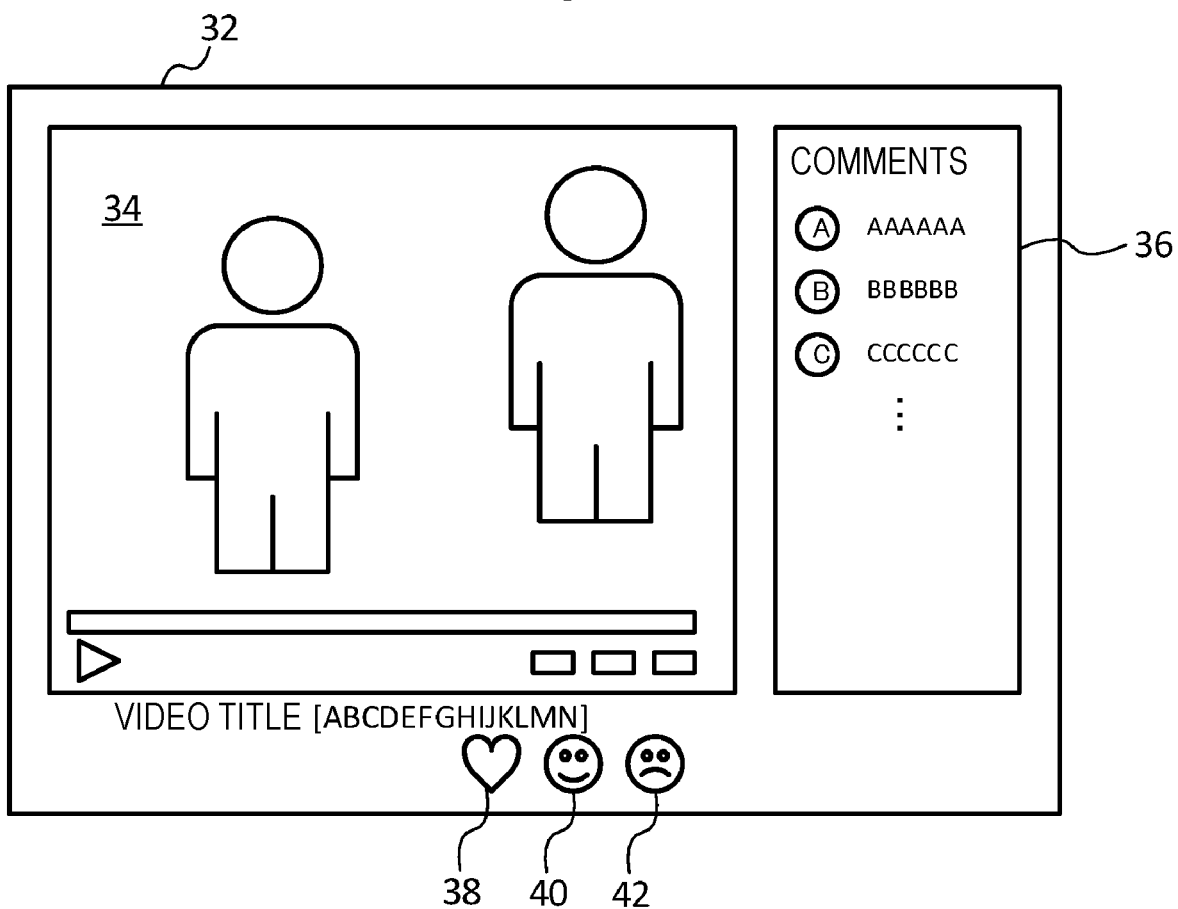
FIG. 4 is a diagram illustrating a screen.

Referring to FIG. 4, Example 1 will be described. FIG. 4 illustrates a screen 32. In Example 1, a user A watches a video and rates the video.

For example, the server 10 provides a video distribution service. The processor 28 of the terminal apparatus 12A that the user A uses accesses a video distribution site, which is a web site on the Internet, in accordance with an access command given from the user A. The video distribution site is a web site on which the video distribution service is usable. For example, the processor 28 of the terminal apparatus 12A uses a web browser, which is an example of application software, to access the video distribution site. On the video distribution site, videos are played for a fee or for free.

The screen 32 is an example of a screen provided on the video distribution site that the user A accesses. On the screen 32, a display area 34 where a video is displayed, and a comment field 36 where users' comments on the video are displayed are formed.

In the display area 34, a video designated by the user from among videos provided on the video distribution site or a video automatically determined on the basis of the video playback history and/or the user's attribute (such as the user's age, sex, preferences, etc.) is displayed and played.

In Example 1, a video displayed and played in the display area 34 corresponds to an example of a rating target. The user A watches the video and rates the video.

On the screen 32, images representing buttons 38, 40, and 42 for rating a video are displayed. By pressing any of the buttons 38, 40, and 42 on the screen 32, a rating corresponding to the pressed button is posted as a rating for the video. Information indicating the rating corresponding to the pressed button is sent to the server 10, and the processor 20 of the server 10 manages the rating. For example, the processor 20 of the server 10 counts ratings of each video.

For example, the button 38 corresponds to the rating "very good", the button 40 corresponds to the rating "good", and the button 42 corresponds to the rating "bad". By pressing the button 38, the rating "very good" is posted. The same applies to the other ratings. These ratings are only exemplary, and buttons and/or the screen 32 may be configured to allow input of other ratings. For example, buttons and/or the screen 32 may be configured to allow posting of a rating regarding the feeling, mental state, or psychological state, such as "happy", "fun", "great", "sorry", or "sad".

For one rating target (such as a video), posting of one rating or plural different ratings may be allowed. In addition, posting of a rating of each part of one rating target may be allowed.

Note that a rating may be input using a sound, character string, or the like. For example, when the user emits a sound that expresses a rating, the loudspeaker collects the sound. The processor 28 of the terminal apparatus 12A analyzes the sound to estimate a rating given by the user A. In addition, the user A may input a character string that expresses a rating using a keyboard, touchscreen, or sound.

The biometric information measuring device 30 measures biometric information of the user A. To-be-measured biometric information is not particularly limited, as described above. Biometric information of the user A, measured by the biometric information measuring device 30, is sent to the terminal apparatus 12A.

The processor 28 of the terminal apparatus 12A receives biometric information of the user A, and analyzes the biometric information, thereby estimating the state such as the feeling, mental state, or psychological state of the user A (hereinafter referred to as "the state of the user A"). As technology for this estimation, technology of the related art may be used. The state such as the feeling may be estimated by the biometric information measuring device 30.

For example, the brain waves of the user A are measured, and the brain waves are analyzed, thereby estimating the state of the user A. In another example, a camera takes a picture of the face of the user A, and an image generated by this shooting is analyzed, thereby specifying the facial expression of the user A, which is an example of biometric information, and estimating the state of the user A on the basis of the facial expression. These are merely examples, and other biometric information may be used.

The state of the user A estimated from biometric information of the user A is estimated to reflect a rating (i.e., a first rating based on the biometric information of the user A) for a rating target (such as a video displayed in the display area 34). Therefore, by analyzing the biometric information of the user A or the state of the user A estimated from the biometric information of the user A, a first rating of the user A for the rating target may be estimated.

Ratings corresponding to the buttons 38, 40, and 42, respectively, are the user A's ratings of the rating target (such as a video displayed in the display area 34) on application software, and correspond to a second rating.

In the case where a first rating and a second rating match, the processor 28 of the terminal apparatus 12A permits the user A to post a rating using application software.

For example, for each first rating, a human's states estimated to reflect the first rating (such as the feeling, mental state, or psychological state) are set in advance, and information indicating the setting is stored in each terminal apparatus 12, the server 10, or the like.

This will be explained with a specific example. A human's states estimated to reflect the first rating "very good" are set in advance, a human's states estimated to reflect the first rating "good" are set in advance, and a human's states estimated to reflect the first rating "bad" are set in advance.

For example, states such as "happiness", "appreciation", "excitement", "pleasure", and "agreement" are estimated to reflect the first rating "very good" or the first rating "good". In accordance with the degree of the states, the states are classified into either the first rating "very good" or the first rating "good". In addition, states such as "sadness", "anger", "disagreement", and "refusal" are estimated to reflect the first rating "bad", and these states are classified into the first rating "bad". Needless to say, these are merely examples, and they may be classified differently.

In the case where plural different states are estimated on the basis of biometric information of the user A, if the number of states reflecting the rating "very good" is largest among these states, the processor 28 of the terminal apparatus 12A determines the rating "very good" as a first rating. The processor 28 of the terminal apparatus 12A may determine a rating corresponding to a state whose measured time is longest as a first rating. For example, in the case where a state corresponding to the rating "very good" is measured for the longest time, the processor 28 of the terminal apparatus 12A determines the rating "very good" as a first rating.

For example, biometric information of the user A when a video (such as a "video α") displayed in the display area 34 is played is measured by the biometric information measuring device 30, and the processor 28 of the terminal apparatus 12A estimates the state of the user A on the basis of the measured biometric information. In the case where the estimated state of the user A is estimated to reflect, for example, "happiness", the processor 28 of the terminal apparatus 12A estimates that the state of the user A reflects either the first rating "very good" or the first rating "good"

in accordance with the degree of the state. Here, as an example, it is assumed that the state of the user A reflects the first rating "very good".

The processor 28 of the terminal apparatus 12A permits a second rating matching the first rating to be posted on application software. For example, the processor 28 of the terminal apparatus 12A permits the user A to press, among the buttons 38, 40, and 42, the button 38 corresponding to a second rating matching the first rating, and does not permit the user A to press the button 40 or 42. In the case where the user A presses the button 38, the processor 28 of the terminal apparatus 12A receives the user A's pressing of the button 38, and sends information indicating the second rating "very good" as information indicating a rating for the video α displayed in the display area 34 to the server 10. The processor 20 of the server 10 receives the information indicating the second rating "very good", and manages the second rating as a rating for the video α. For example, the processor 20 of the server 10 counts ratings of the video α, and, in this case, increases the number of ratings "very good" of the video α.

Note that any of the buttons 38, 40, and 42 may be pressed. In this case, the processor 28 of the terminal apparatus 12A may receive pressing of only the button 38 among the buttons 38, 40, and 42, and may not receive pressing of the button 40 or 42. In short, in the case where the button 38 is pressed, the processor 28 of the terminal apparatus 12A sends information indicating the second rating "very good" to the server 10; and in the case where the button 40 or 42 is pressed, the processor 28 of the terminal apparatus 12A does not send information indicating a second rating corresponding to the button 40 or 42 to the server 10. In this manner, even though each button may be pressed, a second rating permitted to be posted may be limited to a rating matching the first rating.

The difference between the rating "very good" and the rating "good" is a difference in degree. Thus, the processor 28 of the terminal apparatus 12A may permit the user A to press the button 38 or 40 and may not permit the user A to press the button 42, or may receive pressing of the button 38 or 40 and may not receive pressing of the button 42.

The processor 28 of the terminal apparatus 12A may estimate a first rating on the basis of biometric information measured when the user A is watching the video α. For example, a camera (such as a front-facing camera mounted on the display of the terminal apparatus 12A or another camera) takes pictures of the face of the user A, and the processor 28 of the terminal apparatus 12A analyzes images or a video generated by this shooting, thereby estimating the line of sight of the user A. In the case where there is the display area 34 beyond the line of sight, the processor 28 of the terminal apparatus 12A determines that the user A is watching the video α, estimates a first rating on the basis of biometric information of the user A at that time, and permits the user A to post a second rating matching the first rating. In the case where there is no display area 34 beyond the line of sight, the processor 28 of the terminal apparatus 12A determines that the user A is not watching the video α, and, even in the case where biometric information of the user A is measured, does not estimate a first rating on the basis of biometric information of the user A, and does not permit the user A to post a second rating.

In the case where the video α is not being played, the processor 28 of the terminal apparatus 12A may not permit the user A to post a second rating, or may permit the user A to post a second rating matching a first rating based on biometric information of the user A.

In the case where the video α is being played and the user A is watching the video α, the processor 28 of the terminal apparatus 12A may estimate a first rating on the basis of biometric information of the user A, and permit the user A to post a second rating matching the first rating. In the case where the video α is not being played or the user A is not watching the video α, the processor 28 of the terminal apparatus 12A may not permit the user A to post a second rating.

In the case where the video α is being played for a predetermined time or longer, the processor 28 of the terminal apparatus 12A may estimate a first rating on the basis of biometric information of the user A, and permit the user A to post a second rating matching the first rating.

In the case where a second rating is posted using a sound or character string, the processor 28 of the terminal apparatus 12A permits the user A to post a second rating matching the first rating. For example, in the case where the first rating is the rating "very good", if a sound that expresses the rating "very good" or a sound similar to that is collected by a microphone, the first rating matches a rating expressed by the collected sound. In this case, the processor 28 of the terminal apparatus 12A sends information indicating the rating expressed by the collected sound as information indicating the rating for the video α to the server 10. Accordingly, the second rating "very good" is posted. In the case where a sound that expresses the rating "bad" or a sound similar to that is collected by a microphone, the first rating does not match a rating expressed by the collected sound. In this case, the processor 28 of the terminal apparatus 12A does not send information indicating the rating expressed by the collected sound to the server 10. Accordingly, the second rating "bad" is not posted.

Hereinafter, each process applied to Example 1 will be described.

First Process

In a first process, in the case where a second rating is posted using application software (such as in the case where a second rating is posted on a video distribution site), the processor 20 of the server 10 reports the posted second rating to another user other than the user A who posted the second rating. For example, the processor 20 of the server 10 reports the second rating to the account of a user who posted the video α on the video distribution site, or sends information indicating the second rating to a terminal apparatus 12 used by a user who posted the video α.

Second Process

In a second process, in the case where a first rating based on biometric information of the user A does not match a second rating of the user A on application software, the processor 28 of the terminal apparatus 12A reports to the user A guidance to confirm whether to post the second rating using the application software.

For example, in the case where the user A presses a button corresponding to a second rating that does not match a first rating on the screen 32, the processor 28 of the terminal apparatus 12A reports to the user A guidance to confirm whether to post the second rating before actually posting the second rating. The processor 28 of the terminal apparatus 12A may display information (such as a message) indicating the guidance on the display of the terminal apparatus 12A, or may emit a sound that expresses the guidance from the loudspeaker. For example, in the case where the first rating is the rating "very good", if the user A presses the button 42 corresponding to the second rating "bad", the message "Although a rating based on biometric information is the rating 'very good', you are about to post the rating 'bad'. Do you really want to post the rating 'bad'?" is displayed on the display of the terminal apparatus 12A.

In the case where the user A operates the UI 24 to instruct the processor 28 of the terminal apparatus 12A to post the second rating, the processor 28 sends information indicating the second rating to the server 10. In the case where the user A does not instruct the processor 28 of the terminal apparatus 12A to post the second rating, the processor 28 does not send information indicating the second rating to the server 10.

In this manner, in the case where the user A is inquired of whether to post a second rating designated by the user A, and, in accordance with the inquiry, the user A instructs the processor 28 of the terminal apparatus 12A to post the second rating, the second rating is posted; and, in the case where the user A does not instruct the processor 28 to post the second rating, the second rating is not posted.

Third Process

In a third process, the processor 28 of the terminal apparatus 12A changes the tolerance of matching between a first rating based on biometric information of the user A and a second rating of the user A on application software in accordance with the attribute of the user A, and permits the user A to post the second rating using the application software. A user's attribute is, for example, sex, age, occupation, hobbies, qualifications, or the like.

For example, in the case where the user A is an expert on video distribution or the video α, the tolerance of rating matching is wider than that in the case where the user A is not an expert on video distribution or the video α. A first tolerance of each rating in the case where the user A is an expert is wider than a second tolerance of each rating in the case where the user A is not an expert. In the case where the user A is an expert, strict matching of ratings is not required; and, in the case where the user A is not an expert, stricter matching is required.

For example, in the case where the user A is an expert on the video α (such as in the case where the video α is a movie and the user A is a film critic), the processor 28 of the terminal apparatus 12A widens the tolerance of each rating, compared to the case where the user A is not an expert. Specifically, in the case where the user A is an expert on the video α, if the difference between a first rating and a second rating is included in the first tolerance, the processor 28 of the terminal apparatus 12A permits the user A to press a button corresponding to the second rating. In other words, the processor 28 of the terminal apparatus 12A permits the user A to press a button corresponding to a second rating whose difference from a first rating is included in the first tolerance.

In the case where the user A is not an expert on the video α, even if the difference between a first rating and a second rating is included in the first tolerance, if the difference is not included in the second tolerance, the processor 28 of the terminal apparatus 12A does not permit the user A to press a button corresponding to the second rating. In the case where the user A is not an expert on the video α, if the difference between a first rating and a second rating is included in the second tolerance, the processor 28 of the terminal apparatus 12A permits the user A to press a button corresponding to the second rating. In other words, the processor 28 of the terminal apparatus 12A permits the user A to press a button corresponding to a second rating whose difference from a first rating is included in the second tolerance.

Fourth Process

In a fourth process, the processor 28 of the terminal apparatus 12A changes the tolerance of matching between a first rating based on biometric information of the user A and a second rating of the user A on application software in accordance with a scene where the rating target (such as the video α) is rated, and permits the user A to post the second rating using the application software.

The scene is, for example, a scene that requires urgency, a scene that does not require urgency, or a life-related scene.

For example, in the case where a scene where the rating target is rated is a scene that requires urgency, the tolerance of rating matching is wider than that in the case where a scene where the rating target is rated is a scene that does not require urgency. In addition, in the case where a scene where the rating target is rated is a scene where a life-related rating is done, the tolerance of rating matching is wider than that in the case where a scene where the rating target is rated is a scene where matters other than life are rated. A first tolerance of each rating in a scene that requires urgency or a scene where a life-related rating is done is wider than a second tolerance of each rating in a scene that does not require urgency or a scene where matters other than life are rated.

For example, in the case where a scene where the video α is rated is a scene that requires urgency or a scene where a life-related rating is done, the processor 28 of the terminal apparatus 12A widens the tolerance of each rating, compared to the case where a scene where the video α is rated is a scene that does not require urgency or a scene where matters other than life are rated. Specifically, in the case where a scene where the video α is rated is a scene that requires urgency or a scene where a life-related rating is done, if the difference between a first rating and a second rating is included in the first tolerance, the processor 28 of the terminal apparatus 12A permits the user A to press a button corresponding to the second rating. In other words, the processor 28 of the terminal apparatus 12A permits the user A to press a button corresponding to a second rating whose difference from a first rating is included in the first tolerance.

In the case where a scene where the video α is rated is a scene that does not require urgency or a scene where matters other than life are rated, even if the difference between a first rating and a second rating is included in the first tolerance, if the difference is not included in the second tolerance, the processor 28 of the terminal apparatus 12A does not permit the user A to press a button corresponding to the second rating. In the case where a scene where the video α is rated is a scene that does not require urgency or a scene where matters other than life are rated, if the difference between a first rating and a second rating is included in the second tolerance, the processor 28 of the terminal apparatus 12A permits the user A to press a button corresponding to the second rating. In other words, the processor 28 of the terminal apparatus 12A permits the user A to press a button corresponding to a second rating whose difference from a first rating is included in the second tolerance.

In addition, the processor 28 of the terminal apparatus 12A may change the above-mentioned tolerance in accordance with the physical condition of the user A or the time point (such as the time or date) at which the rating is done.

Fifth Process

In a fifth process, in the case where the memory 26 is allowed to store biometric information of the user A when the user A refers to the rating target (such as the video α) and the user A rates the rating target, the processor 28 of the terminal apparatus 12A uses a first rating based on the biometric information of the user A when the user A refers to the rating target as a rating of the user A for the rating target.

For example, biometric information of the user A when the user A is watching the video α is measured, and the biometric information is stored in the memory 26 in association with information for identifying the video α (such as the title of the video α). After that, in the case where the user A rates the video α, when the user A gives a rating command on the screen 32, the processor 28 of the terminal apparatus 12A estimates a first rating on the basis of the biometric information stored in the memory 26 in association with information for identifying the video α, and permits the user A to press a button corresponding to a second rating matching the first rating.

As in the case of rating the rating target such as the video α after referring to the rating target, the time point to refer to the rating target such as the video α may be different from the time point to rate the rating target. The processor 28 of the terminal apparatus 12A allows biometric information of the user A to be measured chronologically and to be stored in the memory 26, uses a rating based on the biometric information when the user A watches the video α as a first rating, and permits the user A to press a button corresponding to a second rating matching the first rating. The processor 28 of the terminal apparatus 12A may manage the time point at which the user A rates the video α.

Sixth Process

In a sixth process, even in the case where posting of a second rating matching a first rating is permitted on the basis of biometric information of the user A when the user A refers to the rating target (such as the video α), if a first rating and the second rating do not match on the basis of biometric information of the user A when the user A rates the rating target, the processor 28 of the terminal apparatus 12A does not permit the user A to post the second rating. In short, even in the case where a first rating and a second rating match at a certain time point in the past, if a first rating based on biometric information when the user A rates the rating target does not match the second rating, the processor 28 of the terminal apparatus 12A does not permit the user A to press a button corresponding to the second rating. The processor 28 of the terminal apparatus 12A permits the user A to press a button corresponding to a second rating matching a first rating based on biometric information when the user A rates the rating target.

Seventh Process

In a seventh process, in the case where a first rating based on biometric information of the user A when the user A refers to the rating target (such as the video α), a first rating based on biometric information of the user A when the user A rates the rating target, and a second rating of the user A on application software match, the processor 28 of the terminal apparatus 12A permits the user A to post the second rating using the application software.

For example, in the case where a first rating based on biometric information of the user A when the user A watches the video α and a first rating based on biometric information of the user A when the user A rates the rating target match, the processor 28 of the terminal apparatus 12A permits the user A to press a button corresponding to a second rating matching these first ratings.

In the case where a first rating based on biometric information of the user A when the user A watches the video α does not match a first rating based on biometric information of the user A when the user A rates the rating target, the processor 28 of the terminal apparatus 12A does not permit the user A to press a button corresponding to the second rating.

Eighth Process

In an eighth process, in the case where biometric information of the user A is not measured, the processor 28 of the terminal apparatus 12A does not permit the user A to post a second rating using application software. In the case where biometric information of the user A is measured, the processor 28 of the terminal apparatus 12A permits the user A to post a second rating using application software.

For example, the biometric information measuring device 30 is a wearable device. In the case where the user A is wearing the wearable device when the user A is watching the video α and the wearable device is measuring biometric information of the user A, the processor 28 of the terminal apparatus 12A permits the user A to press a button corresponding to a second rating matching a first rating based on the biometric information.

In the case where the user A is not wearing the wearable device and the wearable device is not measuring biometric information, the processor 28 of the terminal apparatus 12A does not permit the user A to press a button corresponding to a second rating. In this case, the processor 28 of the terminal apparatus 12A may report to the user A that the biometric information of the user A is not measured. For example, the processor 28 of the terminal apparatus 12A may display a message indicating that the biometric information of the user A is not measured on the screen 32, or may emit a sound that expresses the message from the loudspeaker.

It may be considered that the reason that the biometric information is not measured is, for example, the fact that the user is not wearing the biometric information measuring device 30, there is a communication error, or the biometric information measuring device 30 is broken. Needless to say, the present exemplary embodiment may also be applied in the case where biometric information is not measured for other reasons.

Ninth Process

In a ninth process, in the case where biometric information of the user A is no longer measured while the video α, which is the rating target, is being played, the processor 28 of the terminal apparatus 12A reports to the user A that, in order to rate the video α, the video α will be played again.

For example, the processor 28 of the terminal apparatus 12A may display a message indicating that the video α will be played again on the screen 32, or may emit a sound that expresses the message from the loudspeaker.

For example, although biometric information of the user A had been measured by the wearable device at a time point at which the video α started to play, if the user A stops wearing the wearable device while the video α is being played and, as a result, biometric information of the user A is no longer measured, the processor 28 of the terminal apparatus 12A reports to the user A that the video α will be played again.

In the case where the video α is played from the beginning to the end and biometric information of the user A is measured in the entire playback period, the processor 28 of the terminal apparatus 12A may permit the user A to press a button corresponding to a second rating matching a first rating based on the biometric information. The processor 28 of the terminal apparatus 12A may play the video α after a time point at which biometric information of the user A is no longer measured, estimate a first rating based on biometric information of the user A measured during the playback, and permit the user A to press a button corresponding to a second rating matching the first rating.

In the case where biometric information of the user A is no longer measured while the video α is being played, the processor 28 of the terminal apparatus 12A may not permit the user A to rate the video α after the time point at which biometric information of the user A is no longer measured. In short, the processor 28 of the terminal apparatus 12A may not permit the user A to press a button corresponding to a second rating after the time point at which biometric information of the user A is no longer measured. Up to a point on halfway until which biometric information of the user A had been measured, the processor 28 of the terminal apparatus 12A may permit the user A to press a button corresponding to a second rating matching a first rating based on the biometric information.

The first to ninth processes may also be executed in the case of rating a rating target other than a video. In the ninth process by way of example, if biometric information of the user A is no longer measured while music, which is the rating target, is being played, the user A is reported that the music will be played again. In addition, if biometric information of the user A is no longer measured while the music is being played, the user A may not be permitted to rate the music after a time point at which biometric information of the user A is no longer measured.

Example 2

Referring to FIG. 5, Example 2 will be described. FIG. 5 illustrates a screen 44. In Example 2, application software for exchanging information (such as messages, sounds, images, and so forth) with communication partners is used, and rating is done on the application software.

For example, the server 10 provides a social networking service (SNS). The processor 28 of each user's terminal apparatus 12 executes application software for using the SNS. Accordingly, each user may exchange information with communication partners by using the SNS. For example, each user may exchange information with communication partners by using functions like chat and messenger.

For example, users A, B, C, . . . , and N exchange information with each other by using the SNS. The screen 44 is a screen displayed on the display of the terminal apparatus 12A that the user A uses. For example, in the case where the user A gives a command to execute application for using the SNS, the processor 28 of the terminal apparatus 12A executes the application software, and displays the screen 44 on the display of the terminal apparatus 12A. Screens similar to the screen 44 are also displayed on the displays of the terminal apparatuses 12 that the users B, C, . . . , and N use.

On the screen 44, items of information (such as character strings or images) for identifying the users A, B, C, . . . , and N, messages and images posted by the users A, B, C, . . . , and N, and so forth are displayed. In FIG. 5, for example, an image 46 (such as an icon) for identifying the user N, a message 48 posted by the user N, an image 50 (such as an icon) for identifying the user A, and a message 52 posted by the user A are displayed on the screen 44. Likewise, when the users B, C, and so forth post messages, images for identifying the users who posted the messages and the posted messages are displayed on the screen 44. Images, sounds, and so forth may be sent to the partners. Messages, images, sounds, and so forth may be arranged and displayed according to the order of posting.

In addition, on the screen 44, images representing buttons 38, 40, and 42 for rating a message, image, sound, or the like are displayed. For example, on the screen 44 for the user A, the buttons 38, 40, and 42 are displayed next to messages posted by users other than the user A, and, by pressing one of these buttons 38, 40, and 42, the user A may rate each of the messages next to the buttons 38, 40, and 42. The buttons 38, 40, and 42 according to Example 2 have the same functions as the buttons 38, 40, and 42 according to Example 1. By pressing any of the buttons 38, 40, and 42, the user A may post a second rating for a message, image, sound, or the like. For example, each user may rate each message. The same applies to images and sounds.

For one message, posting of one rating or plural different ratings may be allowed. In addition, posting of a rating of each part of one message may be allowed.

Like Example 1, biometric information of the user A is measured, and the processor 28 of the terminal apparatus 12A estimates a first rating on the basis of the biometric information, and permits the user A to press a button corresponding to a second rating matching the first rating. For example, in the case where the first rating based on the biometric information is the rating "good", the processor 28 of the terminal apparatus 12A permits the user A to press the button 40 corresponding to the second rating "good", and does not permit the user A to press the button 38 or 42.

The first to ninth processes described in Example 1 may also be executed in Example 2. Like Example 1, the second rating may be posted using a sound or the like.

The number of ratings may be displayed in association with each message. For example, for the message 48, the number of the ratings "very good" is one, and the number of the ratings "good" is two. When a user posts a rating for a message, the posting is counted, and the counted number is displayed in association with the message.

By analyzing an image generated by taking a picture of the face of the user A, the processor 28 of the terminal apparatus 12A may specify the line of sight of the user A, specify a message estimated to be viewed by the user A on the screen 44, and post a second rating of the user A for the specified message. The processor 28 of the terminal apparatus 12A may post a second rating of the user A for a message designated by a cursor or the like.

Example 3

Referring to FIG. 6, Example 3 will be described. FIG. 6 illustrates a screen 54. In Example 3, rating targets are files and folders storing files.

A file is, for example, data or a program. Data is, for example, image data, video data, sound data (such as audio data or music data), text data, document data, or a combination of at least two of the foregoing types of data.

A folder is the storage location of a file. A folder may also be referred to as a directory. Even if a folder is created, no file may actually be stored in that folder.

For example, the screen 54 is a screen displayed on the display of the terminal apparatus 12A that the user A uses. On the screen 54, a folder A and files B and C, which are stored in a folder ZZZ, are displayed.

On the screen 54, images representing buttons 38, 40, and 42 for rating a file or folder are also displayed. For example, the buttons 38, 40, and 42 are displayed next to images (such as icons) representing files and folders, and, by pressing one of these buttons 38, 40, and 42, the user A may rate each of the files and folders next to the buttons 38, 40, and 42. The buttons 38, 40, and 42 according to Example 3 have the same functions as the buttons 38, 40, and 42 according to Example 1. By pressing any of the buttons 38, 40, and 42, the user A may post a second rating for a file or folder. For example, each user may rate each file or each folder.

For one file or folder, posting of one rating or plural different ratings may be allowed. In addition, posting of a rating of each part of one file may be allowed.

Like Example 1, biometric information of the user A is measured, and the processor 28 of the terminal apparatus 12A estimates a first rating on the basis of the biometric information, and permits the user A to press a button corresponding to a second rating matching the first rating. For example, in the case where the first rating based on the biometric information is the rating "good", the processor 28 of the terminal apparatus 12A permits the user A to press the button 40 corresponding to the second rating "good", and does not permit the user A to press the button 38 or 42.

The first to ninth processes described in Example 1 may also be executed in Example 3. Like Example 1, the second rating may be posted using a sound or the like.

When the user A opens and refers to a file to be rated, the user A may rate the file by pressing any of the buttons 38, 40, and 42, or may rate the file when the file is closed.

In addition, the number of ratings may be displayed in association with each file or each folder. For example, for the folder A, the number of the ratings "very good" is one, and the number of the ratings "good" is two. When a user posts a rating for a file or folder, the posting is counted, and the counted number is displayed in association with the file or folder.

In Example 3, in the case where ratings, based on biometric information of a user, of files stored in a folder, the number of files being greater than or equal to a threshold, are identical, the identical rating is used as a rating for the folder. For example, in the case where a plurality of files are stored in the folder A, if the rating for, among the plurality of files, files whose number is greater than or equal to a threshold is the rating "very good", the processor 20 of the server 10 determines the rating for the folder A as "very good". In the case where there are plural ratings for files whose number is greater than or equal to a threshold, the processor 20 of the server 10 may determine these ratings as ratings for the folder A or determine ratings whose number is largest as a rating for the folder A.

In Examples 1 to 3 described above, in the case where a plurality of items of application software are used by the user A, the processor 28 of the terminal apparatus 12A does not permit the user A to post a rating using each item of application software.

For example, application software α for using an SNS α and application software β for using an SNS β are activated on the terminal apparatus 12A, and the user A is using the SNS α and the SNS β at the same time to exchange information with respective communication partners in the SNS α and the SNS β. In this case, the processor 28 of the terminal apparatus 12A does not permit the user A to post a rating for information (such as a message, image, sound, or the like) exchanged in the SNS α, and does not permit the user A to post a rating for information exchanged in the SNS β.

As another example, in the case where the video distribution site described in Example 1 and the SNS described in Example 2 are used by the user A, the processor 28 of the terminal apparatus 12A does not permit the user A to rate videos on the video distribution site in Example 1 and in the SNS in Example 2. For example, the processor 28 of the terminal apparatus 12A displays the screens 32 and 44 on the display of the terminal apparatus 12A, and does not permit the user A to press the button 38, 40, or 42 on the screens 32 and 44.

If application software on which the user A is more concentrated is specified on the basis of biometric information of the user A, the processor 28 of the terminal apparatus 12A may permit the user A to post a rating using this application software, and may not permit the user A to post ratings using other items of application software. For example, in the case where the screen 32 of the video distribution site described in Example 1 and the screen 44 of the SNS described in Example 2 are displayed on different displays, the processor 28 of the terminal apparatus 12A specifies the display that the user A is viewing on the basis of the line of sight of the user A. The processor 28 of the terminal apparatus 12A estimates application software realizing a screen displayed on the specified display as application software on which the user A is concentrated, and permits the user A to post a rating using this application software.

In addition, in the case where a plurality of items of software application are used by the user A, the processor 28 of the terminal apparatus 12A may report to the user A to input an identical rating on each item of application software. For example, the processor 28 of the terminal apparatus 12A may display a character string indicating the rating on the display of the terminal apparatus 12A, emit a sound that expresses the rating from the loudspeaker, or display a button corresponding to the rating in a distinguished manner from the other buttons (such as decorating, enlarging, or turning on a button corresponding to the rating in order to emphasize the button).

For example, in the case where the video distribution site described in Example 1 and the SNS described in Example 2 are used by the user A, the processor 28 of the terminal apparatus 12A displays the screens 32 and 44 on the display of the terminal apparatus 12A. The processor 28 of the terminal apparatus 12A reports to the user A to press a button corresponding to an identical rating on the screens 32 and 44. For example, the processor 28 of the terminal apparatus 12A decorates the button corresponding to the rating, display the enlarged button corresponding to the rating, or turn on the button. A message indicating the rating may be displayed on the screens 32 and 44, or a sound that expresses the rating may be emitted from the loudspeaker. For example, in the case where a first rating based on biometric information of the user A is the rating "very good", the processor 28 of the terminal apparatus 12A permits the user A to press the button 38 corresponding to the second rating "very good".

Example 4

Figure 7:
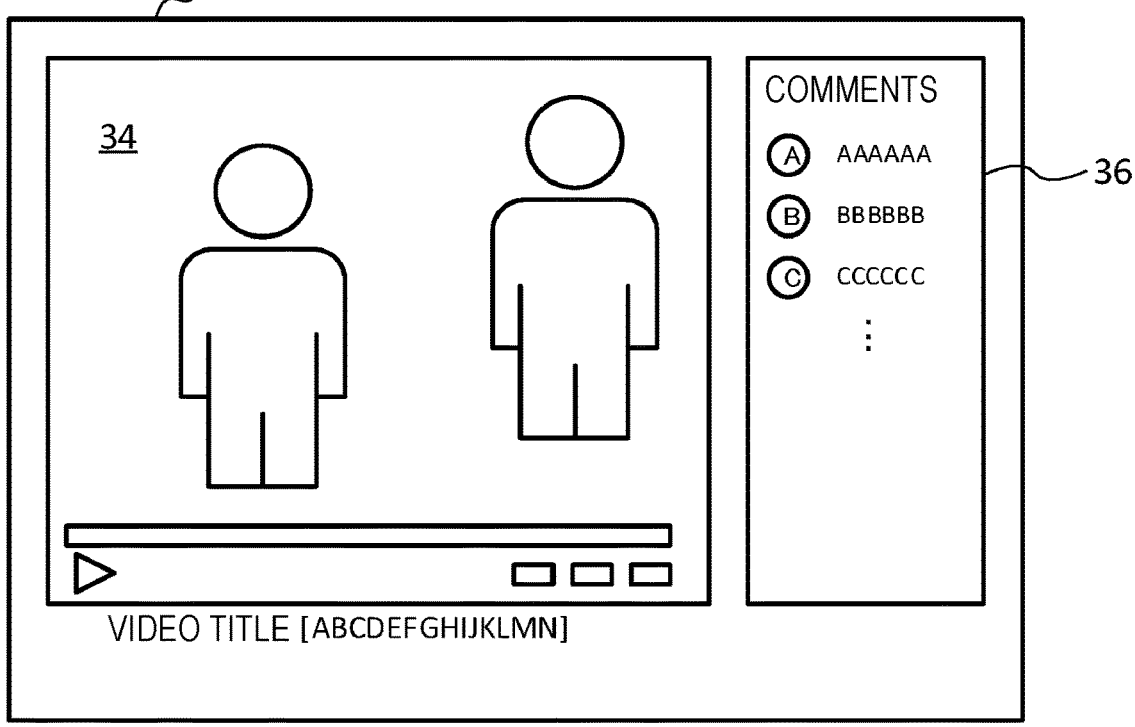
FIG. 7 is a diagram illustrating a screen.
Figure 8:
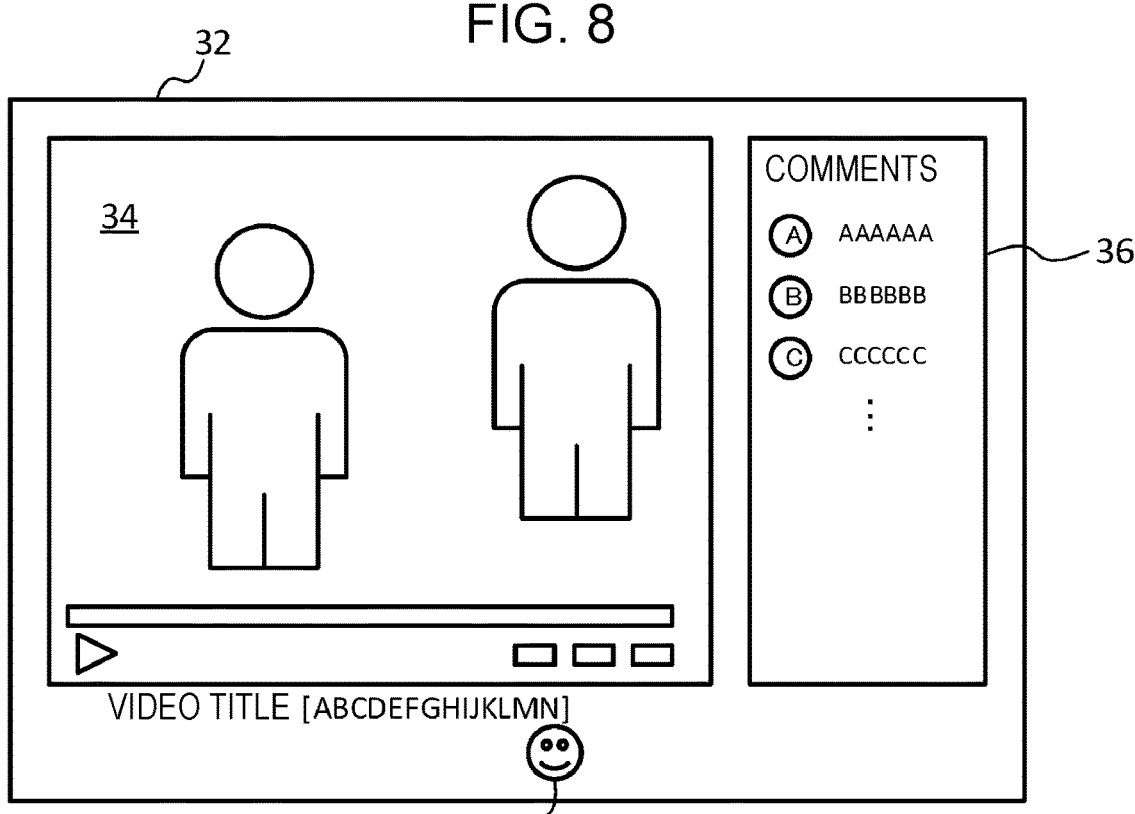
FIG. 8 is a diagram illustrating a screen.

Referring to FIGS. 7 and 8, Example 4 will be described. FIGS. 7 and 8 illustrates the screen 32. In Example 4, like Example 1, the rating target is a video, and the user A accesses a video distribution site, watches a video, and rates the video.

As illustrated in FIGS. 7 and 8, like Example 1, the display area 34 and the comment field 36 are formed on the screen 32. A video is displayed in the display area 34, and each user's comment is displayed in the comment field 36.

Like Example 1, biometric information of the user A is measured by the biometric information measuring device 30, and the processor 28 of the terminal apparatus 12A estimates the state of the user A on the basis of the measured biometric information, and estimates a first rating of the user for the rating target on the basis of the state of the user A.

As illustrated in FIG. 7, unlike Example 1, at a stage at which the first rating of the user A has not been estimated on the basis of biometric information, the buttons 38, 40, and 42 for posting a second rating are not displayed on the screen 32. For example, in the case where biometric information of the user A has not been measured or, even in the case where biometric information of the user A has been measured, if no first rating has been estimated, the buttons 38, 40, and 42 are not displayed on the screen 32. In short, at this stage, the user A is unable to post a second rating by pressing any one the buttons 38, 40, and 42. In addition, the processor 28 of the terminal apparatus 12A does not receive input of a second rating using a sound or characters.

The processor 28 of the terminal apparatus 12A guides the user A on a second rating matching a first rating based on biometric information of the user A. A first rating is a rating for a rating target (such as the video α) and is a rating based on biometric information of the user A.

For example, in the case where biometric information of the user A is measured and a first rating based on the biometric information is estimated as the rating "good", the processor 28 of the terminal apparatus 12A displays the button 40 corresponding to a second rating matching the first rating (that is, a button corresponding to the second rating "good") on the screen 32. By pressing the button 40, the user A is able to post the second rating "good". In this manner, the user A is guided on a second rating matching a first rating based on biometric information of the user A.

In the case where a plurality of different first ratings are estimated on the basis of biometric information of the user A, the processor 28 of the terminal apparatus 12A may guide the user A on a second rating corresponding to each of the first ratings. For example, in the case where the first rating "very good" and the first rating "good" are estimated on the basis of biometric information of the user A, the processor 28 of the terminal apparatus 12A guides the user A on the button 38 corresponding to the second rating "very good" and the button 40 corresponding to the second rating "good".

The processor 28 of the terminal apparatus 12A may display a button corresponding to a second rating matching a first rating, and/or, instead of displaying the button, may emit a sound that expresses the second rating from the loudspeaker.

As another example, like Example 1, the buttons 38, 40, and 42 may be displayed on the screen 32 (see FIG. 4), and the processor 28 of the terminal apparatus 12A may display a button (such as the button 40) corresponding to a second rating matching a first rating in a distinguished manner from the other buttons (such as the buttons 38 and 42). For example, the processor 28 of the terminal apparatus 12A may decorate the button corresponding to the second rating, enlarge the button to be larger than the other buttons, or turn on the button. The processor 28 of the terminal apparatus 12A may emit a sound that expresses the second rating from the loudspeaker, or display a character string indicating the second rating on the screen 32.

Even in the case where the user A gives no command to post a second rating (such as even in the case where the user A presses none of the buttons 38, 40, and 42), the processor 28 of the terminal apparatus 12A may post a first rating based on biometric information of the user A as a rating for the video α. In short, the first rating may be automatically posted.

In the case where the video α is being played for a predetermined time or longer, the processor 28 of the terminal apparatus 12A may estimate a first rating on the basis of biometric information of the user A, and guide the user A on a second rating corresponding to the first rating. In the case where the length of the playback time of the video α is shorter than a predetermined time, the processor 28 of the terminal apparatus 12A does not guide the user A on a second rating corresponding to the first rating.

In the case where the video α includes a plurality of scenes, the processor 28 of the terminal apparatus 12A may permit the user A to rate each scene.

Although the rating target is the video α in the example illustrated in FIGS. 7 and 8, the process according to Example 4 may be applied to the case of rating a rating target other than a video.

In addition, the first to ninth processes described in Example 1 may also be executed in Example 4.

The functions of the units of the above-described server 10 and terminal apparatuses 12 are realized by, for example, cooperation between hardware and software. For example, the functions of each apparatus are realized by reading and executing, by a processor of each apparatus, a program stored in memory of each apparatus. The program is stored in the memory via a recording medium such as a compact disc (CD) or a digital versatile disc (DVD) or via a communication channel such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
   determine a first rating of a user for a rating target that is based on biometric information of the user;
   receive a second rating input by the user for the rating target and input on application software used by the user; and
   permit the user to post the second rating using the application software when the first rating and the second rating match,
   wherein the first rating of the rating target and the second rating of the rating target are contemporaneous ratings of the rating target.

2. The information processing apparatus according to claim 1, wherein the second rating is posted using the application software, and the second rating is reported to another user.

3. The information processing apparatus according to claim 1, wherein the processor is configured to:
report, to the user, guidance to confirm whether to post the second rating using the application software when the first rating does not match the second rating.

4. The information processing apparatus according to claim 2, wherein the processor is configured to:
report, to the user, guidance to confirm whether to post the second rating using the application software when the first rating does not match the second rating.

5. The information processing apparatus according to claim 1, wherein the processor is configured to:
not permit the user to post the second rating using the application software when the first rating does not match the second rating.

6. The information processing apparatus according to claim 1, wherein the processor is configured to:
change tolerance of matching between the first rating and the second rating in accordance with an attribute of the user, and permit the user to post the second rating.

7. The information processing apparatus according to claim 6, wherein the processor is configured to:
change tolerance of matching between the first rating and the second rating in accordance with a scene where the rating target is rated, and permit the user to post the second rating.

8. The information processing apparatus according to claim 1, wherein the processor is configured to:
cause memory to store the biometric information of the user when the user refers to the rating target; and
when the user rates the rating target, use a third rating based on biometric information of the user when the user refers to the rating target.

9. The information processing apparatus according to claim 8, wherein the processor is configured to:
determine that posting of a rating is not permitted based on biometric information of the user when the user rates the rating target, and not permit the user to post a rating.

10. The information processing apparatus according to claim 1, wherein the processor is configured to:
determine a third rating based on biometric information of the user when the user refers to the rating target,
determine a fourth rating based on biometric information of the user when the user rates the rating target,
determine that the second rating the third rating and the fourth rating match, and
permit the user to post the second rating using the application software.

11. The information processing apparatus according to claim 1, wherein:
the rating target includes a file and a folder storing a file; and
where the first rating for files stored in the folder are identical, the number of files being greater than or equal to a threshold, the first rating is used as a rating for the folder.

12. The information processing apparatus according to claim 1, wherein the processor is configured to:
not permit the user to post a rating where biometric information of the user is not measured.

13. The information processing apparatus according to claim 12, wherein the processor is further configured to:
report to the user that biometric information of the user is not measured.

14. The information processing apparatus according to claim 12, wherein:
the rating target is a video or music; and
the processor is further configured to:
report to the user that the video or the music will be played again where biometric information of the user is no longer measured while the video or the music is being played.

15. The information processing apparatus according to claim 12, wherein:
the rating target is a video or music; and
the processor is further configured to:
not permit the user to post a rating after a time point at which biometric information of the user is no longer measured while the video or the music is being played.

16. The information processing apparatus according to claim 1, wherein the processor is further configured to:
not permit the user to post a rating using each item of application software where a plurality of items of application software are used by the user.

17. The information processing apparatus according to claim 1, wherein:
the first rating is based on biometric information measured from the user over a time that is longer than or equal to a predetermined length.

18. An information processing method comprising:
determining a first rating of a user for a rating target that is based on biometric information of the user;
receiving a second rating input by the user for the rating target and input using application software used by the user; and
permitting the user to post the second rating using the application software when the first rating and the second rating match,
wherein the first rating of the rating target and the second rating of the rating target are contemporaneous ratings of the rating target.

19. A non-transitory computer readable medium storing a program causing a computer to execute a process, the process comprising:
determining a first rating of a user for a rating target that is based on biometric information of the user;
receiving a second rating input by the user for the rating target and input using application software used by the user; and
permitting the user to post the second rating using the application software when the first rating and the second rating match,
wherein the first rating of the rating target and the second rating of the rating target are contemporaneous ratings of the rating target.

* * * * *